Sept. 6, 1932.                G. M. WRIGHT                    1,876,124
                    WIRELESS TELEGRAPHY AND TELEPHONY
                    Filed Jan. 17, 1928         2 Sheets-Sheet 1

INVENTOR
GEORGE M. WRIGHT
BY
ATTORNEY

Sept. 6, 1932.   G. M. WRIGHT   1,876,124
WIRELESS TELEGRAPHY AND TELEPHONY
Filed Jan. 17, 1928   2 Sheets-Sheet 2

INVENTOR
GEORGE M. WRIGHT
BY *H. S. Grover*
ATTORNEY

Patented Sept. 6, 1932

1,876,124

UNITED STATES PATENT OFFICE

GEORGE MAURICE WRIGHT, OF BURFORD, ENGLAND, ASSIGNOR TO RADIO CORPORATION OF AMERICA, A CORPORATION OF DELAWARE

WIRELESS TELEGRAPHY AND TELEPHONY

Application filed January 17, 1928, Serial No. 247,350, and in Great Britain January 17, 1927.

This invention relates to wireless telegraphy and telephony, and more particularly to systems of wireless telegraphy and telephony in which a plurality of separated receiving aerials is provided.

Such systems have been employed in endeavours to obviate the effects of "fading", for, since these said effects do not appear to occur simultaneously at different points on the earth's surface, even when the said points are separated by quite small distances, the sum total of signal strength obtained from a plurality of aerials should not be liable to approximate to zero as a result of fading.

It has been found, however, that simple combination of the signals received upon a plurality of aerials does not solve the problem, owing to the phase difference which may occur at any instant between received signals; for example, if, at any instant, the phase difference between two signals were 180°, the resultant would tend towards zero.

According to this invention in multiple aerial receiving systems means are provided for combining the signals from the aerials in a common circuit, in such manner as to be effectively additive irrespective of phase relationship.

This may be effected by modulating a receiving heterodyne or in some way "chopping" the received signal before combination.

In some cases the aerials are located comparatively close to one another (for example, successful results have been achieved when working on a wave length of 17 metres with aerials spaced 250 yards apart), and in such cases, more especially if short wave lengths be employed, there arises the further difficulty that interference between the receiving aerials is liable to occur. For example, where heterodyne reception is employed, the oscillators, of which there may be four or more operating simultaneously, tend to interfere with one another and set up beat tones. Again, mutual interference is very prone to occur where super-regenerative receivers are employed, for, as is well known, such receivers re-radiate strongly.

Preferably, therefore, in carrying out this invention, the receivers associated with a multiple aerial receiving system are rendered operative and inoperative at audio or supersonic frequency, in such manner that only one receiver is operative at a time.

Figure 1:
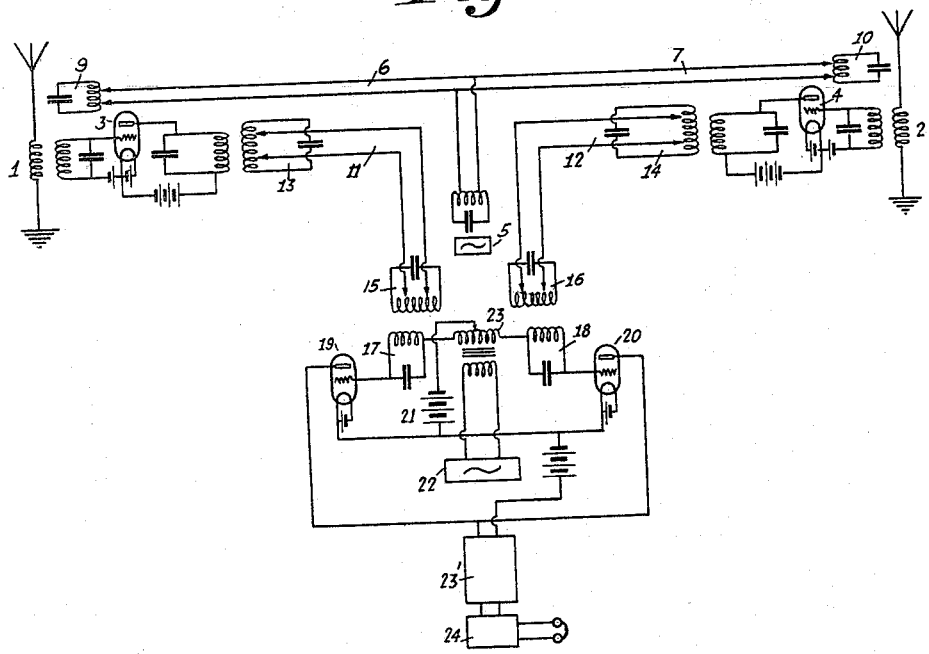
Figure 2:
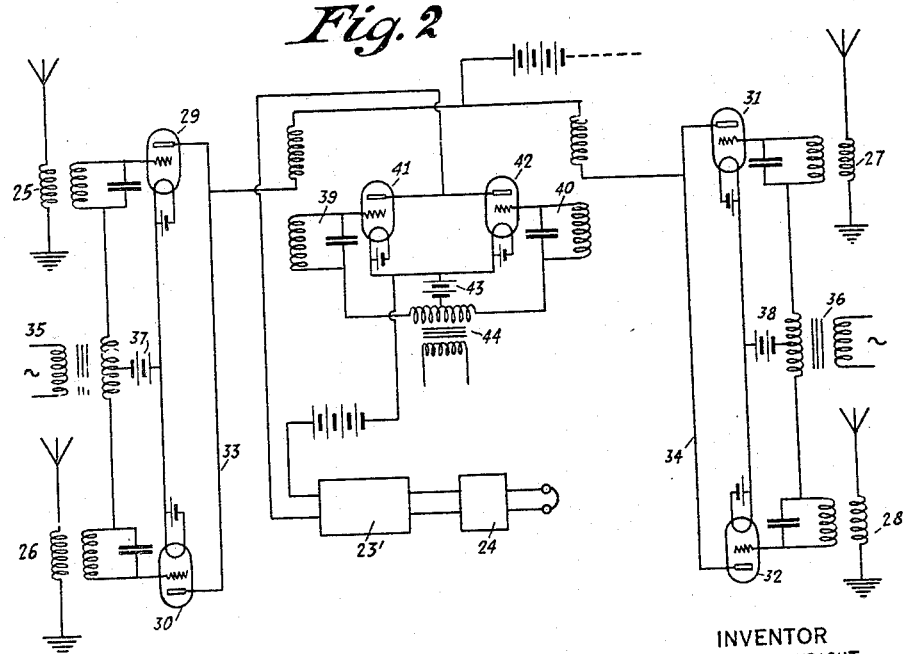

The invention is illustrated in the accompanying drawings, in which Figure 1 shows in conventional diagrammatic form a receiving installation comprising two aerials, and Figure 2 a receiving installation comprising four aerials. It is, of course, to be understood that the invention is applicable to receiving installations comprising any desired plurality of aerials.

Figure 3:
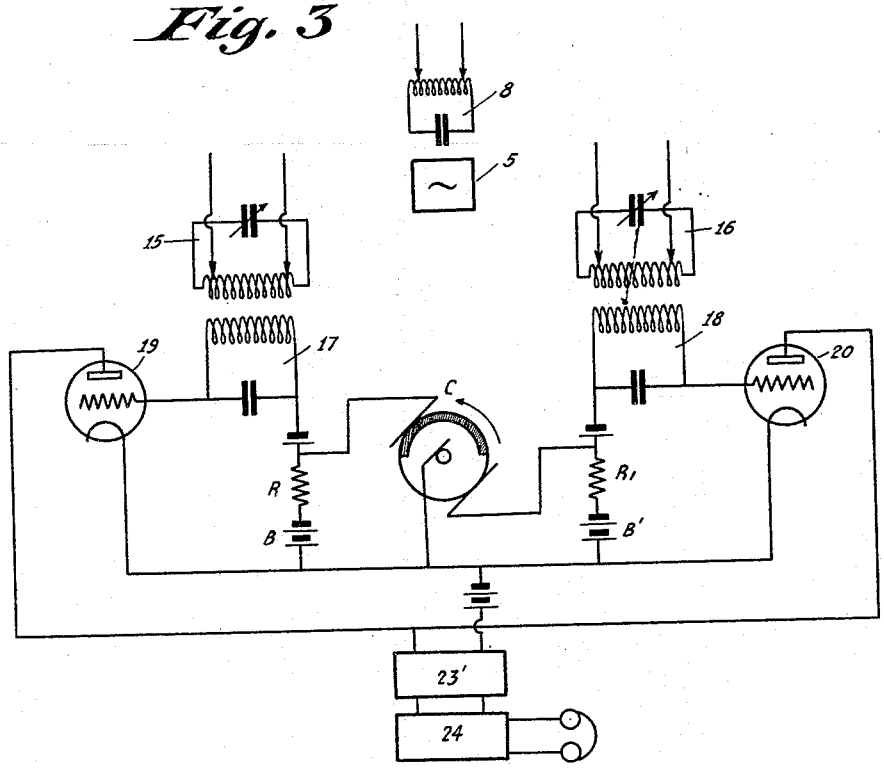
Figure 4:
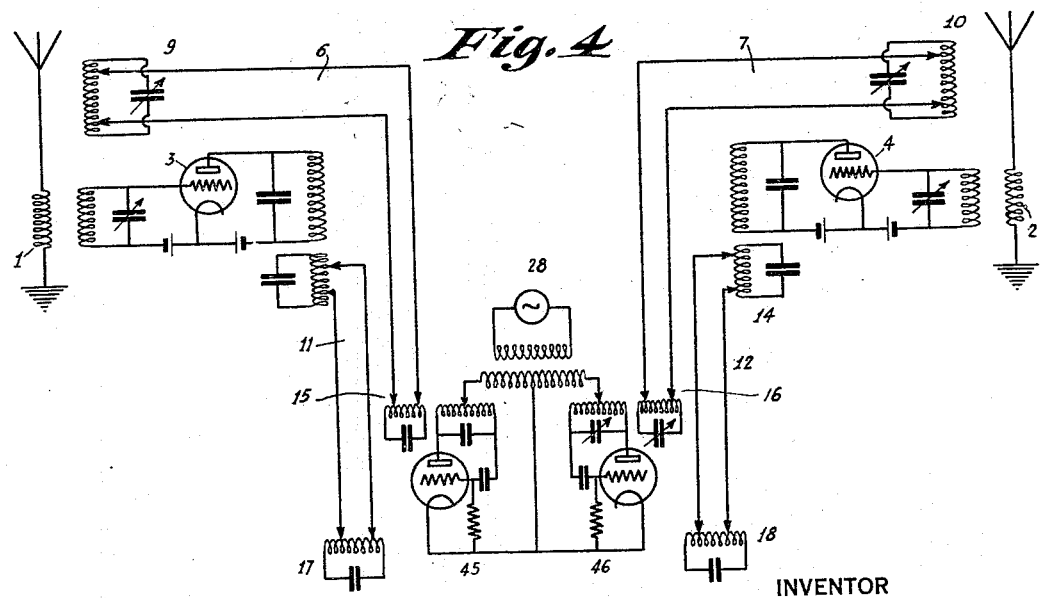

Figure 3 illustrates apparatus for carrying out the present invention with a rotating commutator and, Figure 4 illustrates apparatus for using a receiving system according to the present invention operating on the heterodyne principle, the receiver oscillations being controlled from a common generator.

Referring to Figure 1, 1, 2 are short wave receiving aerials which are coupled respectively to thermionic valves 3, 4 arranged as rectifiers. 5 is a short wave oscillator which is common to both rectifiers and whose output is supplied thereto over feeders 6, 7 and coupling circuits 8, 9, 10. Output at supersonic frequency is passed via feeders 11, 12 and coupling circuits 13, 14, 15, 16, 17 and 18 to thermionic valves 19, 20 whose grids are biassed by means of the battery 21, so that the said valves are normally at their rectifying points. The output from an audio or supersonic frequency oscillator 22 is superimposed through a transformer 23 upon the grids of the valves 19, 20 whose anode circuits are connected to feed into a common supersonic frequency amplifier 23', the output of which is passed to a low frequency amplifier and detector 24.

It will be seen that, assuming the oscillator 22 not to be working, no signal will be passed to the amplifier 23', owing to the grid bias applied to the valves 19, 20. When, however, the oscillator 22 functions, the grids of the valves 19, 20 will be driven alternately positive and negative respectively, so that each said valve will, in turn, effectively couple its associated aerial to the final receiver. In this way the signals from the aerials 1 and 2 are combined independently of phase.

In the modification shown in Figure 2, there are four spaced receiving aerials represented at 25, 26, 27 and 28. These aerials are coupled to thermionic valves 29, 30, 31, 32 whose anodes are connected together in pairs by leads 33, 34 and upon whose grid circuits are superimposed by means of transformers 35, 36 low frequency oscillations from a common low frequency oscillator (not shown). The grids of the valves 29, 30, 31, 32 are biassed by means of batteries 37, 38 (one battery for each pair of valves) so that the said valves are normally set to their rectifying points. It will be seen that, owing to the action of the low frequency oscillator, the pairs of valves will become alternately effectively conductive, so that signals will appear alternately in leads 33 and 34. That is to say, the apparatus, in so far as described, effectively combined the signals from aerials 25, 26 independently of phase (in lead 33) and also the signals from aerials 27, 28 independently of phase (in lead 34).

Signals in leads 33 and 34 are now passed through coupling circuits 39, 40 to the grids of further valves 41, 42, whose grids are biassed by means of a battery 43 in a manner similar to that already described in connection with valves 29, 30, 31, 32 and upon whose said grids are superimposed, by means of a transformer 44, oscillations from a second low frequency oscillator (not shown) whose frequency is twice that of the low frequency oscillator already referred to. Output from the valves 41, 42 is led to amplifiers 23′, 24 corresponding to the similarly indicated amplifiers in the arrangement of Figure 1, and it will be seen that the action of the valves 41, 42 and their co-operating low frequency oscillator, will result in the combination independently of phase of the signals from leads 33, 34. Thus the signals from all the aerials 25, 26, 27, 28 are combined independently of phase, the said aerials coming into effective operation successively.

Any other arrangements for "chopping" or otherwise independently combining the signals from a plurality of aerials may be employed. For example, when two or more aerials and associated oscillating receivers are employed, the oscillators may be supplied from a plurality of note generators having definite phase displacement one to another, or, alternatively, there may be employed a rotating commutator or like device arranged to render each receiver operative in turn at an audible rate.

Figure 3 illustrates a method of employing a rotating commutator, the illustration being a modified form of the invention as disclosed in Figure 1. Rotation of the commutator C which may be accomplished in any suitable fashion, causes valves 20 and 19 to become conductive alternately. As the grid biasing resistance R is high, valve 19 becomes conductive only when the combination of the battery B and the resistance R are short circuited by the commutator. Similarly, and alternately, valve 20 becomes conductive and amplifies.

Again, in a multiple aerial receiving system operating on the heterodyne principle, the receiver oscillators may be supplied (for example, with anode potential) or controlled from a common note frequency generator in such manner that only one oscillator is working at a time. For example, if there be two receiving oscillators, they may be effectively controlled by the note frequency generator, so that one oscillator functions during the positive half wave of the generator, the other functioning during the other half wave.

Figure 4 shows a method of using a receiving system operating on the heterodyne principle, the receiver oscillations being controlled from the common note frequency generator 28, so that one oscillator functions during the positive half wave from generator 28 while the other functions during the other half wave. That is, the two high frequency oscillators 45, 46 are made to operate, by virtue of varying plate potentials, on alternate half cycles of the local oscillator 28. For the sake of simplicity, the rest of the structure of Figure 4 has been omitted as it is identical to that shown in Figure 1.

When the received signals are constituted by telephony, the rate at which the receivers are rendered operative and inoperative should be supersonic. Such an arrangement is particularly suitable for application to super-regenerative receivers, all the said receivers being normally maintained in "quenched" condition, the damping being removed from each receiver in succession.

Having now particularly described and ascertained the nature of my said invention and in what manner the same is to be performed, I declare that what I claim is:—

1. Radio signalling apparatus comprising means for collecting electromagnetic energy of like frequency at a plurality of separated points, means for beating the energy so collected with locally generated electrical energy and means for successively translating the resulting beat frequency energies.

2. Radio signalling apparatus comprising means for collecting electromagnetic energy of like frequency at a plurality of separated points, means for beating the energies so collected near to each point of collection with locally generated electrical energy, and means for translating successively the resulting beat frequency energies.

3. Radio signalling apparatus comprising means for collecting electromagnetic energy of like frequency at a plurality of separated points, means for locally generating electrical energy, means for beating the locally generated energy and the collected energies, and means for translating the resulting beat frequency energies successively at a super-audible rate.

4. In a radio signalling system, the combination of a plurality of collectors collecting energy of like frequency, a local oscillator, means for beating the output of the local oscillator and the energy collected at each one of said collectors, means for feeding the resulting beat frequency energy into a common circuit, electron discharge devices associated with said common circuit, and another oscillator associated with said electron discharge devices for rendering effective at one time in the output circuit of said electron discharge devices solely energy collected upon one of said collectors.

5. In combination, a plurality of separated antennæ each collecting energy of like frequency, an electron discharge device coupled to each of said antennæ, a pair of electron discharge devices connected in push-pull fashion, a source of alternating current coupled to the control electrodes of the electron discharge devices connected in push-pull fashion whereby the electron stream in each of said push-pull connected devices is alternately turned on and off, circuits for coupling the outputs of each electron discharge devices at each antenna to a pair of input electrodes of said push-pull connected electron discharge devices, and means for translating the output of the push-pull connected electron discharge devices.

GEORGE MAURICE WRIGHT.